(12) United States Patent
Sherwin

(10) Patent No.: US 7,240,760 B2
(45) Date of Patent: Jul. 10, 2007

(54) STEERING APPARATUS

(75) Inventor: Kenneth A. Sherwin, West Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 11/188,822

(22) Filed: Jul. 25, 2005

(65) Prior Publication Data

US 2007/0017734 A1    Jan. 25, 2007

(51) Int. Cl.
  *B62D 3/14*    (2006.01)
  *B62D 5/04*    (2006.01)
  *B62D 5/06*    (2006.01)

(52) U.S. Cl. .................... 180/421; 180/422; 180/444; 180/446; 280/773

(58) Field of Classification Search ............... 180/421, 180/422, 444, 446; 280/773
See application file for complete search history.

(56) References Cited

U.S. PATENT DOCUMENTS

| | | | |
|---|---|---|---|
| 4,519,627 A | 5/1985 | Shibahata et al. | |
| 4,771,846 A | 9/1988 | Venable et al. | |
| 4,893,825 A | 1/1990 | Janson | |
| 5,050,697 A | 9/1991 | Umemura | |
| 5,333,700 A | 8/1994 | Mouri | |
| 5,369,583 A | 11/1994 | Hazelden | |
| 5,709,281 A | 1/1998 | Sherwin et al. | |
| 6,202,694 B1 | 3/2001 | Gilbert et al. | |
| 6,382,342 B1 | 5/2002 | Peppler | |
| 6,575,265 B2* | 6/2003 | Richardson et al. | 180/444 |
| 6,655,709 B2 | 12/2003 | Sherwin et al. | |
| 6,763,907 B2* | 7/2004 | Ueno et al. | 180/444 |
| 2002/0189892 A1 | 12/2002 | Appleyard | |
| 2003/0226711 A1* | 12/2003 | Menjak et al. | 180/446 |
| 2004/0040780 A1 | 3/2004 | Szabela et al. | |
| 2005/0167184 A1* | 8/2005 | Hong et al. | 180/446 |
| 2006/0006020 A1* | 1/2006 | Ono et al. | 180/446 |

* cited by examiner

*Primary Examiner*—Lesley D. Morris
*Assistant Examiner*—Marc A. Scharich
(74) *Attorney, Agent, or Firm*—Tarolli, Sundheim, Covell & Tummino LLP

(57) ABSTRACT

A vehicle steering apparatus (10) includes a steering gear assembly (20) which is connected with a steerable vehicle wheel (12). A first sensor (26) has an output signal which is a function of steering wheel position. A second sensor (28) has an output signal which is a function of steerable wheel position. A controller (30) is operable to provide an output signal when the steerable vehicle wheel position does not correspond to the steering wheel position. A motor (34) is connected with a differential gear mechanism (36). The motor (34) is operable in response to the output signal from the controller (30) to effect operation of the differential gear mechanism (36) to actuate the steering gear assembly (20) and change the position of the steerable vehicle wheel (12).

7 Claims, 1 Drawing Sheet

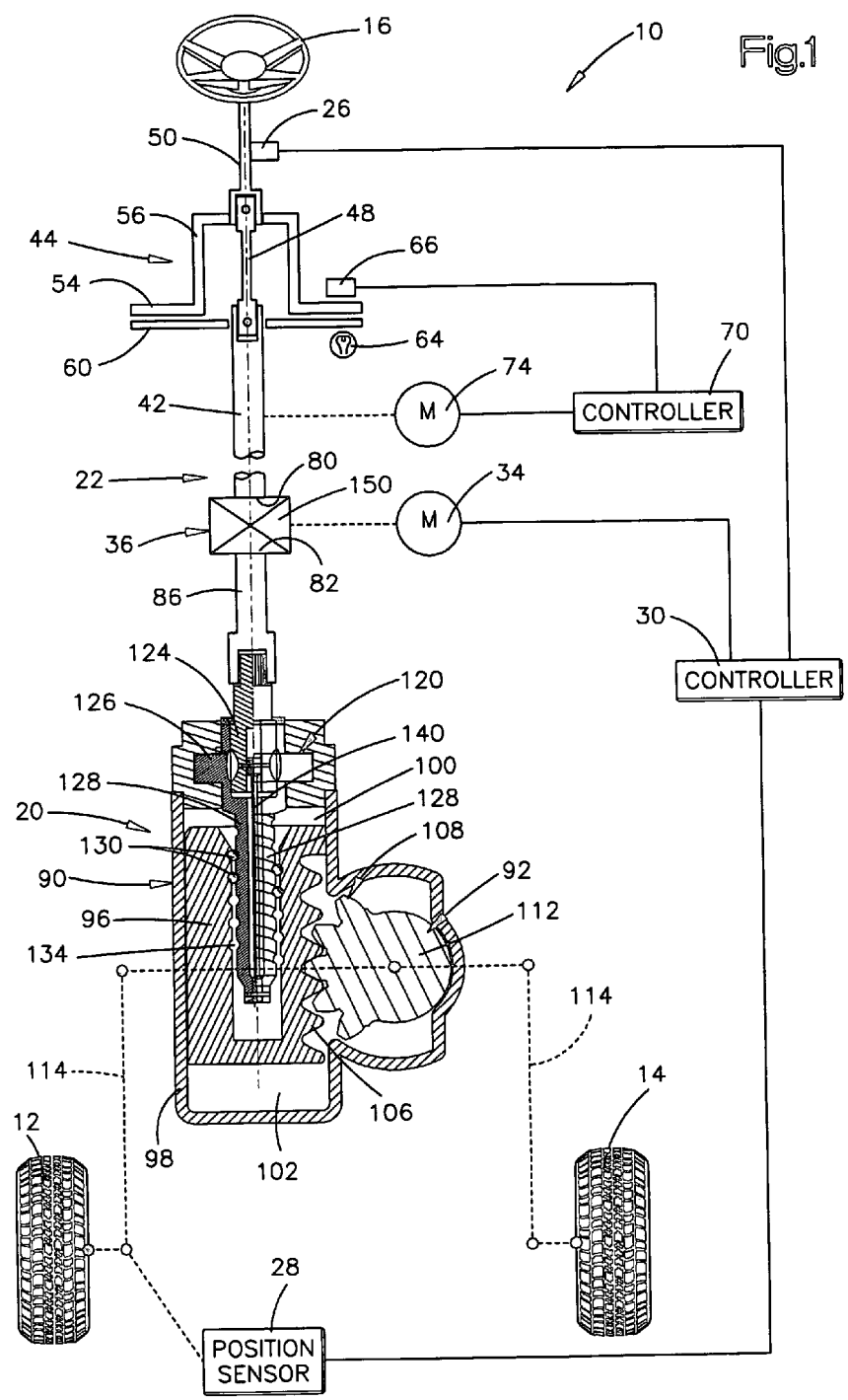

STEERING APPARATUS

BACKGROUND OF THE INVENTION

The present invention relates to a steering apparatus for use in turning steerable vehicle wheels.

During operation of a vehicle having steerable wheels, the position of a manually rotatable steering wheel for the vehicle may not agree with the position of a steerable wheel of the vehicle. This may be caused by lash in the steering apparatus, joint phasing, and/or elastic yielding of components of the steering apparatus. The resulting difference between the desired position of the steerable vehicle wheel and the position of the steering wheel may be objectionable to a driver of the vehicle.

SUMMARY OF THE INVENTION

The present invention relates to a new and improved steering apparatus having a steering gear assembly connected with a steerable vehicle wheel. A force transmitting apparatus is connected with the steering gear assembly and a vehicle steering wheel which is manually rotated by an operator of the vehicle. The force transmitting apparatus includes a differential gear mechanism.

A first sensor has an output which is a function of steering wheel position. A second sensor has an output which is a function of steerable vehicle wheel position. A controller is connected with the sensors. A motor is operable in response to an output from the controller to effect operation of the differential gear mechanism to actuate the steering gear assembly and change the position of the steerable vehicle wheel.

The present invention has a plurality of features which may be used in combination with each other as disclosed herein. Alternatively, the features of the invention may be used in various combinations with each other and/or in combination with features from the prior art.

BRIEF DESCRIPTION OF THE DRAWINGS

The foregoing and other features of the invention will become more apparent upon a consideration of the following description taken in connection with the accompanying drawing, wherein:

FIG. 1 is a schematic illustration of a steering apparatus which is constructed in accordance with the present invention and is used to turn steerable vehicle wheels.

DESCRIPTION OF THE PREFERRED EMBODIMENTS

A steering apparatus 10 (FIG. 1) is utilized to turn steerable wheels 12 and 14 of a vehicle in response to manual rotation of a steering wheel 16. The apparatus 10 includes a steering gear assembly 20 which is connected with the vehicle steering wheel 16 by a force transmitting apparatus 22.

A steering wheel position sensor 26 has an output which is a function of the position of the steering wheel 16. A steerable wheel position sensor 28 has an output which is a function of the position of the steerable vehicle wheel 12. The steerable wheels 12 and 14 are interconnected by a known steering linkage. Therefore, the output from the steerable wheel position sensor 28 is a function of the positions of both of the steerable vehicle wheels 12 and 14.

A controller 30 compares the output from the steering wheel position sensor 26 to the output from the steerable wheel position sensor 28. If the position of the steerable wheel 12 does not correspond to the position of the steering wheel 16 during a steering operation, the controller 30 effects operation of a bi-directional electric motor 34 to drive a differential gear mechanism 36 in the force transmitting apparatus 22. Operation of the motor 34 during a steering operation results in the differential gear mechanism 36 effecting operation of the steering gear assembly 20 to adjust the position of the steerable vehicle wheels 12 and 14 to correspond to the position of the steering wheel 16.

The steering wheel 16 is connected with a shaft 42 in the force transmitting apparatus 22 by a torque sensor assembly 44. The torque sensor assembly 44 includes a torsion bar 48 which is connected with a steering column shaft 50. The steering column shaft 50 is coaxial with the torsion bar 48 and the shaft 42 in the force transmitting apparatus 22.

A circular input disc 54 in the torque sensor assembly 44, is connected to the upper (as viewed in FIG. 1) end of the torsion bar 48 and the lower end of the steering column shaft 50 by a housing 56. A circular output disc 60 is connected to the shaft 42 in the force transmitting apparatus 22. The output disc 60 is disposed in a coaxial relationship with and extends parallel to the input disc 54.

The input disc 54 and output disc 60 have apertures which cooperate with a light source 64 and a light detector 66. The output from the light detector 66 varies as a function of variations in the extent of alignment of apertures in the input and output discs 54 and 60. If desired, the torque sensor assembly 44 may have a sensor system which is different than the illustrated optical system.

When the steering wheel 16 is manually rotated to initiate turning movement of the steerable vehicle wheels 12 and 14, torque is transmitted through the steering column shaft 50 to the torsion bar 48. This torque results in torsional deflection of the torsion bar 48 and in movement of the input disc 54 relative to the output disc 60. The relative movement between the input disc 54 and output disc 60 results in a variation in the signal transmitted from the light detector 66 to a controller 70 due to a change in the spatial relationship between apertures in the discs.

In response to the variations in the signal sent from the light detector 66, the controller 70 effects energization of a reversible electric motor 74 which is connected with the shaft 42 in the force transmitting apparatus 22. Operation of the electric motor 74 is effective to resist rotation the shaft 42 by the steering wheel 16. The resistance to steering wheel rotation by the motor 74 provides simulated road feel during manual rotation of the steering wheel 16 and turning of the steerable vehicle wheels 12 and 14.

When the steering wheel 16 is rotated in one direction, for example clockwise, the motor 74 is operated by the controller 70 to resist rotation of the shaft 42 in a clockwise direction with a torque which is less than and is a function of torque applied to the steering wheel and sensed by the torque sensor assembly 44. Similarly, when the steering wheel 16 is rotated in a counterclockwise direction, the motor 74 is energized by the controller 70 to resist rotation the shaft 42 in a counterclockwise direction with a torque which is less than and is a function of the torque applied to the steering wheel and sensed by the torque sensor assembly 44. When the steerable vehicle wheels 12 and 14 have been turned by the steering gear assembly 20 through an arcuate distance corresponding to rotation of the steering wheel 16, the apertures in the input disc 54 and output disc 60 will again be aligned with each other and operation of the motor 74 is interrupted by the controller 70.

The torque sensor assembly 44 has the same construction as is disclosed in U.S. Pat. No. 5,369,583. However, the torque sensor assembly 44 may have a different construction if desired. For example, the torque sensor assembly 44 may utilize strain gauges in association with the torsion bar 48 to detect the extent of torsional deflection of the torsion bar. Of course, other known torque sensing devices may be used if desired.

Rotation of the shaft 42 under the influence of the steering wheel 16 is transmitted to a first input 80 to the differential gear mechanism 36. The differential gear mechanism 36 may be of the planetary type or the bevel gear type. Rotation at the input 80 is transmitted from an output 82 from the differential gear mechanism 36. The output 82 from the differential gear mechanism 36 is connected to a shaft 86. The shaft 86 is connected to the steering gear assembly 20.

The steering gear assembly 20 is of the well-known integral type and includes a reversible fluid (hydraulic) motor 90 which is connected with a drive mechanism 92. The fluid motor 90 includes a generally cylindrical piston 96 which divides a housing 98 into an upper variable volume chamber 100 and a lower variable volume chamber 102. The piston 96 has rack teeth 106 which are disposed in meshing engagement with teeth on a sector gear 108.

The sector gear 108 is connected to an output shaft 112. The output shaft 112 may be connected by a pitman arm (not shown) to a known steering linkage 114. The steering linkage 114 is effective to turn the steerable vehicle wheels 12 and 14 in response to rotation of the output shaft 112.

A directional control valve 120 is mounted on an upper (as viewed in FIG. 1) end of the housing 98. The directional control valve assembly 120 is operable to direct high pressure fluid from a pump or other source of fluid pressure to one of the upper and lower variable volume chambers 100 and 102. At the same time, the directional control valve assembly 120 is effective to connect the other variable volume chamber in fluid communication with a drain or reservoir.

The directional control valve assembly 120 includes a rotatable inner valve member or core 124 which is connected to the shaft 86. A rotatable outer valve member or sleeve 126 is connected to a follow-up member 128 having an external thread convolution which is engaged by balls 130. The balls 130 are disposed in engagement with an internal thread convolution 134 formed in the piston 96. The inner valve member 124 is connected to the outer valve member 126 by a torsion bar 140.

Upon rotation of the inner valve member 124 relative to the outer valve member 126 by the shaft 86, high pressure fluid is directed from a source of fluid under pressure (not shown) to one of the variable volume chambers 100 and 102. For example, the high pressure fluid may be directed to the upper variable volume chamber 100. At the same time, the inner and outer valve members 124 and 126 cooperate to connect the lower variable volume chamber 102 with reservoir or drain. This results in the piston 96 being moved downward (as viewed in FIG. 1).

As the piston 96 moves relative to the housing 98, the rack teeth 106 on the piston cause the sector gear 108 to rotate about its central axis. Rotation of the sector gear 108 cause the steering linkage 114 to turn the steerable vehicle wheels 12 and 14 in the same direction and through the same arcuate distance. The construction of the reversible fluid motor 90 and directional control valve 120 is generally similar to the constructions disclosed in U.S. Pat. Nos. 6,382,342 and 6,202,694 and will not be further described herein.

When a steering operation is to be undertaken, the steering wheel 16 is manually rotated. Rotation of the steering wheel 16 applies a steering input torque to the steering column shaft 50 and the torsion bar 48. The resulting deflection of the torsion bar 48 moves the apertures in the input disc 54 out of alignment with the apertures in the output disc 60. This results in a change in the output from the light detector 66 and operation of the controller 70 to energize electric motor 74 to apply a steering resistance torque to the shaft 42. The steering resistive torque is less than the steering output torque so that the shaft 42 is rotated by the steering input torque.

Steering input torque is transmitted from the steering wheel 16 through the torsion bar 48 and shaft 42 to the differential gear mechanism 36. Torque is transmitted from the differential gear mechanism 36 through the shaft 86 to the inner valve member 124 in the directional control valve 120. The torque applied to the inner valve member 124 is effective to rotate it relative to the outer valve member 126.

As the inner valve member 124 rotates, the torsion bar 140 is resiliently deflected and relatively high fluid pressure is directed to one of the variable volume chambers 100 or 102. Fluid communication between the other variable volume chamber and drain or reservoir is increased. This results in operation of a fluid motor 90 to rotate the sector gear 108. Rotation of the sector gear 108 actuates the steering linkage 114 to turn the steerable vehicle wheels 12 and 14 in the same direction, that is, the direction in which the steering wheel 16 is rotated.

As the steerable vehicle wheels 12 and 14 are being turned, the position sensor 28 provides an output to the controller 30 indicating the position of the steerable vehicle wheels 12 and 14 relative to a body of a vehicle in which the steering apparatus 10 is disposed. The controller 30 compares the position indicated by the steerable wheel position sensor 28 to the position indicated by the steering wheel position sensor 26. If the two positions coincide, the controller 30 does not energize the motor 34. However, if the position of the steerable vehicle wheels 12 and 14 does not coincide with the position of the steering wheel 16, the motor 34 is energized to provide an input to the differential gear mechanism 36.

The input from the motor 34 to the differential gear mechanism 36 is effective to modify the output from the differential gear mechanism. This causes the steerable vehicle wheels 12 and 14 to change their positions relative to the steering wheel 16 as the steering wheel is being rotated. Once the output from the steerable wheel position sensor 28 coincides with the output from the steering wheel position sensor 26, the controller 30 interrupts operation of the motor 34. The steering maneuver is completed with the positions of the steerable vehicle wheels 12 and 14 in agreement with the position of the steering wheel 16.

When the motor 34 is operated during a steering operation to modify the output torque transmitted from the differential gear mechanism 36 to the steering gear assembly 20, torque is also transmitted from the differential gear mechanism to the shaft 42. The motor 74 applies sufficient force to the shaft 42 to offset the torque transmitted from the differential gear mechanism 36 to the shaft 42 as a result of operation of the motor 34. This results in the steering wheel 16 being isolated from force transmitted from the motor 34 when the motor is energized during a steering operation.

For example, when the controller 30 determines that the position of the steerable vehicle wheel 12 is lagging behind the position of the steering wheel 16 during clockwise rotation of the steering wheel, the motor 34 is energized to drive an input 150 to the differential gear mechanism 36 in a first direction.

This may result in the application of clockwise torque to the shaft 42. This clockwise torque would be additative to the clockwise torque transmitted from the steering wheel 16 to the shaft 42 and would result in an increase in the resistive force transmitted from the motor 74 to the shaft 42. However, very little, if any, torque would be transmitted from the differential gear mechanism 36 to the steering wheel 16.

Similarly, when the controller determines that the position of the steerable vehicle wheel 12 is leading the position of the steering wheel 16 during clockwise rotation of the steering wheel, the motor 34 is energized to drive the input 150 to the differential gear mechanism 36 in a second direction which is opposite to the first direction. This may result in the application of a counterclockwise torque to the shaft 42. This counterclockwise torque would be substractive to the clockwise torque transmitted from the steering wheel 16 to the shaft 42 and would result in a decrease in the resistive force transmitted from the motor 74 to the shaft 42. Therefore, very little, if any, torque would be transmitted from the differential gear mechanism 36 to the steering wheel 16.

From the above description of the invention, those skilled in the art will perceive improvements, changes and modifications. Such improvements, changes and modifications within the skill of the art are intended to be covered by the appended claims.

Having described the invention, the following is claimed:

1. A steering apparatus for use in turning steerable vehicle wheels, said steering apparatus comprising:
   a steering gear assembly connected with a steerable vehicle wheel;
   a manually rotatable steering wheel;
   a force transmitting apparatus which is connected with said steering gear assembly and said steering wheel, said force transmitting apparatus includes a differential gear mechanism having a first input connected with said steering wheel and an output connected with said steering gear assembly;
   a first sensor having an output signal which is a function of steering wheel position;
   a second sensor having an output signal which is a function of steerable vehicle wheel position;
   a controller which is connected with said first and second sensors and is operable to provide an output signal when said steerable vehicle wheel position does not correspond to said steering wheel position;
   a motor connected with said controller and a second input to said differential gear mechanism, said motor being operable in response to said output signal from said controller to effect operation of said differential gear mechanism to actuate said steering gear assembly and change the position of the steerable vehicle wheel; and
   a second motor connected with said force transmitting apparatus at a location between said differential gear mechanism and said steering wheel, said second motor being operable during operation of said motor connected to said second input to said differential gear mechanism.

2. The apparatus as set forth in claim 1 further including a steering linkage which extends between the steerable vehicle wheel and said steering gear assembly, said steering gear assembly including a fluid motor connected with said steering linkage and a valve assembly which is connected in fluid communication with said fluid motor and a source of fluid under pressure, said valve assembly includes a first valve member which is connected with said force transmitting apparatus and a second valve member which cooperates with said first valve member to direct fluid flow to said fluid motor.

3. The apparatus as set forth in claim 1 wherein said force transmitting apparatus includes a torque transmitting member connected with the steering wheel and with said first input to said differential gear mechanism, a second motor is connected with said torque transmitting member and is operable to apply to said torque transmitting member a torque which opposes torque applied to said torque transmitting member at said first input to said differential gear mechanism during operation of said motor connected to said second input to said differential gear mechanism.

4. A steering apparatus for use in turning steerable vehicle wheels, said steering apparatus comprising:
   a steering gear assembly connected with a steerable vehicle wheel;
   a manually rotatable steering wheel;
   a force transmitting apparatus which is connected with said steering gear assembly and said steering wheel, said force transmitting apparatus includes a differential gear mechanism having a first input connected with said steering wheel and an output connected with said steering gear assembly; said force transmitting apparatus includes a torque transmitting member connected with the steering wheel and with said first input to said differential gear mechanism;
   a first sensor having an output signal which is a function of steering wheel position;
   a second sensor having an output signal which is a function of steerable vehicle wheel position;
   a controller which is connected with said first and second sensors and is operable to provide an output signal when said steerable vehicle wheel position does not correspond to said steering wheel position;
   a motor connected with said controller and a second input to said differential gear mechanism, said motor being operable in response to said output signal from said controller to effect operation of said differential gear mechanism to actuate said steering gear assembly and change the position of the steerable vehicle wheel; and
   a second motor connected with said torque transmitting member and operable to apply a torque to said torque transmitting member in a direction opposite to a direction in which torque is applied to said torque transmitting member at said first input to said differential gear mechanism during operation of said motor connected to said second input to said differential gear mechanism.

5. A steering apparatus for use in turning steerable vehicle wheels, said steering apparatus comprising:
   a steering linkage connected with the steerable vehicle wheels;
   a fluid motor connected with said steering linkage and operable to effect turning movement of the steerable vehicle wheels;
   a valve connected in fluid communication with said fluid motor and operable to effect operation of said fluid motor;
   a differential gear mechanism having an output connected to said valve, said differential gear mechanism having a first input connected with a manually rotatable steering wheel, said differential gear mechanism having a second input connected with an electric motor;

a first sensor having an output signal which is a function of steering wheel position;

a second sensor having an output signal which is a function of steerable vehicle wheel position;

a controller which is connected with said first and second sensors and with said electric motor, said controller being operable to provide an output signal which effects operation of said electric motor when said steerable vehicle wheel position does not correspond to said steering wheel position, said valve being rotatable by said output from said differential gear mechanism under a combined influence of force applied to said first and second inputs to said differential gear mechanism by the steering wheel and said electric motor when said steerable vehicle wheel position does not correspond to said steering wheel position.

6. The apparatus as set forth in claim 5 further including means for isolating the steering wheel from force transmitted from the electric motor during operation of the electric motor.

7. The apparatus as set forth in claim 6 wherein said means for isolating the steering wheel from force transmitted from the electric motor includes a second electric motor which is connected with the steering wheel.

* * * * *